(12) United States Patent
Hecht

(10) Patent No.: US 7,896,585 B2
(45) Date of Patent: Mar. 1, 2011

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 80 days.

(21) Appl. No.: 12/507,556

(22) Filed: Jul. 22, 2009

(65) Prior Publication Data
US 2010/0061814 A1    Mar. 11, 2010

(30) Foreign Application Priority Data
Sep. 11, 2008    (IL) .................................. 194030

(51) Int. Cl.
*B26D 1/00*    (2006.01)
*B26D 1/03*    (2006.01)
(52) U.S. Cl. ...................... 407/110; 407/117
(58) Field of Classification Search .......... 407/110.117, 407/91, 92, 72; 83/845, 839
See application file for complete search history.

(56) References Cited

U.S. PATENT DOCUMENTS

| | | | |
|---|---|---|---|
| 4,357,123 A | | 11/1982 | Zweekly |
| 4,588,333 A | * | 5/1986 | Gustafson .................... 407/117 |
| 4,938,640 A | * | 7/1990 | Pano et al. ................... 407/110 |
| 5,516,241 A | * | 5/1996 | Plutschuck et al. .......... 407/110 |
| 5,795,109 A | * | 8/1998 | Jonsson et al. ................ 407/72 |
| 5,820,309 A | | 10/1998 | Mihic |
| 6,234,727 B1 | * | 5/2001 | Barazani ..................... 407/117 |
| 2002/0081165 A1 | | 6/2002 | Hecht |

FOREIGN PATENT DOCUMENTS

| DE | 102005014121 | 9/2006 |
|---|---|---|
| EP | 1424151 | 6/2004 |

OTHER PUBLICATIONS

International Search Report in PCT/IL2009/000758, dated Nov. 11, 2009.

* cited by examiner

*Primary Examiner*—Will Fridie, Jr.
(74) *Attorney, Agent, or Firm*—Womble Carlyle

(57) ABSTRACT

A cutting tool includes an insert holder and a cutting insert releasably retained between upper and lower jaws of the insert holder. The lower jaw is provided with forward and rear projections. The forward projection has forward projection front and back abutment surfaces inclined, respectively, at first and second angles to a feed direction, the first angle being greater than the second angle. The cutting insert has a cutting portion adjacent a longitudinally extending shaft portion and a recess in a lower insert surface. The recess has front and back recess abutment surfaces inclined, respectively, at the first and second angles to a lower edge of the shaft portion. The forward projection front abutment surface abuts the front recess abutment surface, and the forward projection back abutment surface abuts the back recess abutment surface.

15 Claims, 4 Drawing Sheets

CUTTING TOOL AND CUTTING INSERT THEREFOR

FIELD OF THE INVENTION

The present invention relates to a cutting tool for grooving and turning operations.

BACKGROUND OF THE INVENTION

Grooving operations are typically performed by a cutting insert retained in an insert pocket located between upper and lower jaws of a tool holder. In some applications, the tool holder may be a relatively narrow holder blade, as shown for example in U.S. Pat. No. 4,357,123. In other applications the tool holder may have a relatively narrow holder blade-type forward portion, where the insert is retained, and a rear part of larger dimensions, as shown for example in U.S. Pat. No. 5,795,109. In some applications, the tool holder may be disc shaped, as shown for example in U.S. Pat. No. 5,820,309.

One of the problems with many of the tool holders of the types mentioned above and also of other types of tools holders is that the cutting inserts retained in the tool holders may become dislodged from their designed position due to outward or inward movement of the cutting insert. This may happen, for example, during slotting operations when attempting to withdraw the holder blade from a work piece. In some cases the cutting insert can be completely pulled out of the holder blade and become embedded in the work piece. Another example is with rotary slot-cutting tools where the cutting insert can even fly out of the insert pocket under the influence of centrifugal forces, a situation that can be particularly dangerous when operating at high speeds.

In U.S. Pat. No. 4,938,640 there is illustrated a metal cutting tool in which a cutting insert is clamped in a seat of a tool holder defined between oppositely facing clamping surfaces of clamping jaws of the tool holder. The lower clamping surface is provided with an arched projection which is adapted to fit in an arched recess formed in a base surface of the cutting insert, thereby providing a mechanism for preventing inward and outward displacement of the cutting insert. However, the seat of the tool holder cannot seat double ended cutting inserts. Moreover, even if one would attempt to locate a double ended cutting insert in the seat, the clamping jaws would have to be forced apart sufficiently to enable the insertion of the non-operative cutting end of the cutting insert into the seat since the free end of the upper clamping jaw is located directly opposite the projection, thereby minimizing the distance between the upper and lower clamping jaws at the forward end of the seat. Furthermore, with the free end of the upper clamping jaw located directly opposite the projection, the cutting portion of the cutting insert has to be positioned outside of the seat to distance the upper clamping edge from the cutting edges of the cutting insert, otherwise the chips removed from the workpiece would damage the upper clamping edge. A consequence of the cutting portion of the cutting insert being positioned outside of the seat is that it has no support from below.

Additionally, the arched projection and arched recess are not optimized for maximum prevention of inward and outward displacement of the cutting insert since no angles are given for the sloping surfaces of the arched protrusion and the arched recess. The arched protrusion and the arched recess are simply designed so that the projection will fit into the arched recess. Additionally, the clamping surface of the lower jaw comprises a simple keying rib extending rearwardly from the arched protrusion, whereby the stability of the insert is not uniquely determined.

SUMMARY OF THE INVENTION

According to embodiments of the present invention there is provided a cutting tool comprising an insert holder and a cutting insert releasably retained in an insert pocket located in an insert retaining portion of the insert holder. The insert pocket is formed by a gap between an upper jaw and a lower jaw of the insert holder. The insert pocket has a longitudinal axis defining a longitudinal direction and a forward to rear direction. The upper jaw has an upper jaw lower surface facing a lower jaw upper surface of the lower jaw. The lower jaw is provided with forward and rear projections separated by a lower jaw indentation. The upper jaw has a free end located longitudinally rearward of the forward projection. In accordance with some embodiments, the forward projection has two forward projection front sections each inclined at a first angle to the feed direction of the cutting tool and two forward projection back sections each inclined at a second angle to the feed direction of the cutting tool. In accordance with the present invention, the first angle is greater that the second angle. In accordance with some embodiments, the first angle may take on values in the range 25° to 50° and the second angle may take on values in the range 20° to 45° but with the constraint that the second angle is smaller than the first angle.

The cutting insert comprises an upper insert surface, a lower insert surface and a peripheral side surface extending therebetween. In accordance with some embodiments, the cutting insert is a double-ended insert and the lower insert surface is provided with a recess adjacent each end of the cutting insert. Located between the recesses is a lower abutment surface which may be in the form of a generally V-shaped groove. In accordance with some embodiments, the cutting insert is single-ended and the lower insert surface is provided with a recess adjacent one end of the cutting insert only, the remainder of the lower insert surface being a lower abutment surface which may be in the form of a generally V-shaped groove. The recess has a complimentary shape to the forward projection of the lower jaw and comprises a front recess section inclined at the first angle and a back recess section inclined at the second angle.

When the cutting insert is retained in the insert pocket, at least a portion of the upper jaw lower surface adjacent a free end of the upper jaw abuts a section of the upper abutment surface of the cutting insert, the forward projection of the lower jaw abuts an associated recess in the lower insert surface with the front recess section abutting the forward projection front section and the back recess section abutting the forward projection back section, and the rear projection of the lower jaw abuts the lower abutment surface of the cutting insert.

BRIEF DESCRIPTION OF THE DRAWINGS

For a better understanding of the present invention and to show how the same may be carried out in practice, reference will now be made to the accompanying drawings, in which.

Figure 1:
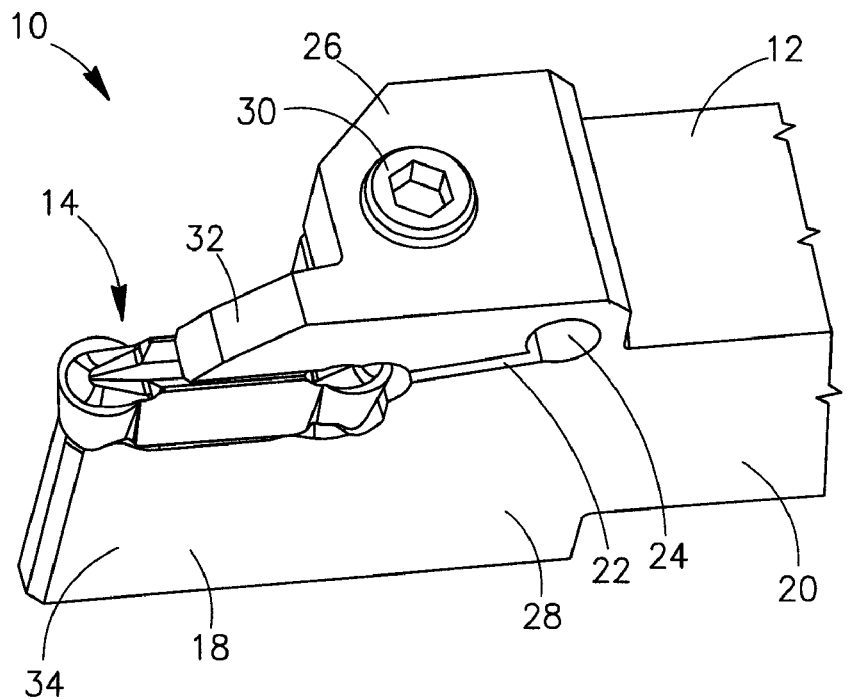
FIG. 1 is a top perspective view of a cutting tool according to embodiments of the present invention.
Figure 2:
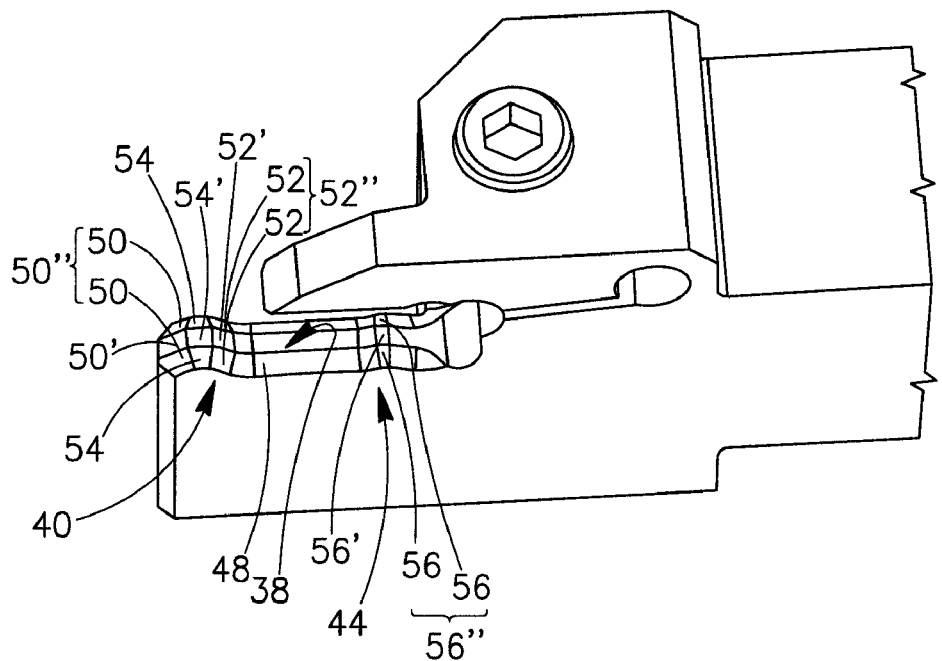
FIG. 2 is the top perspective view of an insert holder according to embodiments of the present invention.
Figure 3:
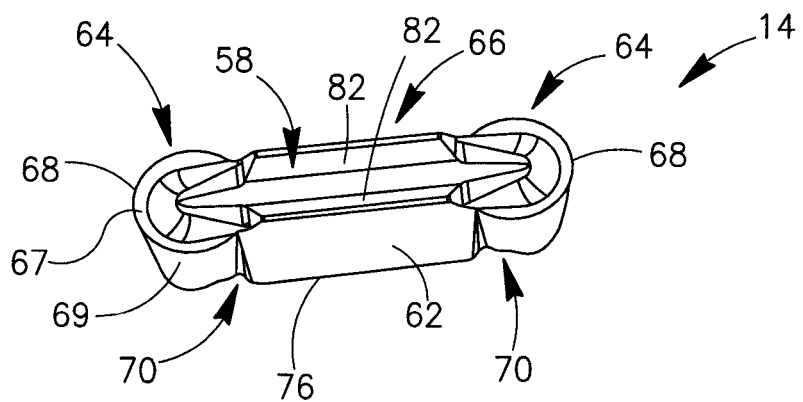
FIG. 3 is a top perspective view of a cutting insert according to embodiments of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is made to the figures. A cutting tool 10 according to embodiments of the invention comprises an insert holder 12 with a cutting insert 14 releasably retained in an insert pocket 16 located in an insert retaining portion 18 of the insert holder 12. The cutting tool 10 may be used for metal cutting operations and the cutting insert 14 may be made of an extremely hard and wear-resistant material such as cemented carbide, either by form-pressing and sintering carbide powders in a binder or by powder injection molding methods. The insert pocket 16 has a longitudinal axis L which in accordance with some embodiments of the invention may be aligned with a feed direction F of the cutting tool 10. The longitudinal direction defines a longitudinal direction and a forward to rear direction. Extending from the insert retaining portion 18 in a direction away from the insert pocket 16 is a tool body portion 20 of the insert holder 12. A resilience slit 22 extends rearwardly from the insert pocket 16 and terminates in a resilience aperture 24. The insert pocket 16 and the resilience slit 22 divide the insert holder 12 into a top clamp 26 and a lower tool body portion 28. A clamping screw 30 received in the top clamp 30 and threadingly received in the lower tool body portion 28 may be used for altering the distance between the top clamp 26 and the lower tool body portion 28.

A forward portion of the top clamp 26 forms an upper jaw 32 in the insert retaining portion 18 of the insert holder 12. Opposite the upper jaw 32, in the insert retaining portion 18 of the insert holder 12, is a lower jaw 34. The insert pocket 16 is formed by a gap between the upper jaw 32 and the lower jaw 34. The upper jaw 32 has an upper jaw lower surface 36 facing a lower jaw upper surface 38 of the lower jaw 34. The upper jaw lower surface 36 may be in the form of a longitudinal rib. In accordance with some embodiments, the upper jaw lower surface 36 may have a convex shape in a cross-section taken in a plane perpendicular to the longitudinal axis L. In some embodiments the convex shape may be a convex V-shape. The lower jaw 34 is provided with a forward projection 40 adjacent a forward end 42 of the insert retaining portion 18 and a rear projection 44 adjacent a rear end 46 of the insert retaining portion 18 and also adjacent a rear end 47 of the insert pocket 16. The forward and rear projections 40, 44 are separated by a lower jaw indentation 48. The forward end 42 of the insert retaining portion 18 is also the forward end 42 of the insert holder 12. The forward and rear projections 40, 44 have a common reference plane P, the forward projection 40 projecting to a first height H above the common reference plane P, the rear projection 44 projecting to a second height h above the common reference plane P, where H is greater than h.

The surface of the forward projection 40 may be divided into several surface sections. In accordance with some embodiments, the forward projection 40 may have two forward projection front sections 50 which are inclined to each other and which are each inclined at a first angle α to the feed direction F of the cutting tool 10 and two forward projection back sections 52 which are inclined to each other and which are each inclined at a second angle β to the feed direction F of the cutting tool. In accordance with some embodiments, the first angle α may take on values in the range 25° to 50° and the second angle β may take on values in the range 20° to 45° that are smaller than the first angle. In other words, whatever values that the first and second angles α and β take on in the given ranges, the first angle α is greater than the second angle β.

The forward projection front sections 50 act as an "inward stop" to prevent inward movement of the cutting insert 14 into the insert pocket 16 and the forward projection back sections 52 act as an "outward stop" to prevent outward movement of the cutting insert 14 from the insert pocket 16.

In accordance with some embodiments, the forward projection 40 may further be provided with two forward projection intermediate sections 54. One forward projection intermediate section 54 being located between, and spacing apart, each pair of forward projection front and back sections 50, 52. The two forward projection front sections 50 may be separated by a mid forward projection front section 50'. The two forward projection back sections 52 may be separated by a mid forward projection back section 52' and the two forward projection intermediate sections 54 may be separated by a mid forward projection intermediate section 54'. The two forward projection front sections 50 may lie on a common surface forming a forward projection front abutment surface 50". The two forward projection back sections 52 may lie on a common surface forming a forward projection back abutment surface 52". The forward projection front abutment surface 50" and the forward projection back abutment surface 52" may thus be separated in the longitudinal direction by the forward projection intermediate sections 54, which generally do not serve as abutment surfaces when the cutting insert 14 is seated in the insert pocket 16.

The surface of the rear projection 44 may be divided into several surface sections. In accordance with some embodiments, the rear projection 44 may have two rear projection sections 56 which are inclined to each other. In some embodiments, the rear projection sections 56 are not inclined to the feed direction F of the cutting tool. In some embodiments, the two rear projection sections 56 may be separated by a mid rear projection section 56'. The two rear projection sections 56 of the rear projection 44 may lie on a common surface forming a rear projection abutment surface 56". The rear projection abutment surface 56" may lie on part of a surface of an imaginary longitudinal rib which may have a convex shape in a cross-section taken in a plane perpendicular to the feed direction F and the common reference plane P. In some embodiments the convex shape may be a convex V-shape.

The cutting insert 14 comprises an upper insert surface 58, a lower insert surface 60 and a peripheral side surface 62 extending between the upper and lower insert surfaces 58, 60. In accordance with some embodiments, the cutting insert 14 may be a double-ended insert, elongated in form, with a cutting portion 64 at either end of a shaft portion 66. The shaft portion 66 extends from adjacent each cutting portion 64 along the longitudinal direction of the cutting insert 14. Each cutting portion 64 is provided with a cutting edge 68 formed at the intersection of a rake surface 67, over which chips flow during a cutting process, formed in the upper insert surface 58 and a relief surface 69 formed in the peripheral side surface 62. With the cutting insert 14 located in the insert pocket 16 (see, e.g., FIG. 7), one cutting portion 64, located at the forward end 42 of the insert retaining portion 18 of the insert holder 12, is an operative cutting portion 64' (i.e., is in a position enabling it to participate in a cutting operation) and the other cutting portion 64, located within the insert pocket 16 is a non-operative cutting portion 64".

The lower insert surface 60 is provided with a recess 70 adjacent each end of the cutting insert 14, or equivalently adjacent to and extending into each cutting portion 64. Located between the recesses 70 in the lower insert surface 60, extending along the shaft portion 66, is a lower abutment surface 72 in the form of a longitudinal groove. In accordance with some embodiments, lower abutment surface 72 may have a concave shape in a cross-section taken in a plane perpendicular to the longitudinal direction of the cutting insert 14. In some embodiments, the concave shape may be a concave V-shape. The lower abutment surface 72 has a complementary shape to the shape of the surface of the imaginary longitudinal rib on which the two rear projection sections 56 of the rear projection 44 lie. Each recess 70 has a complementary shape to the shape of the forward projection 40 of the lower jaw 34.

Figure 7:
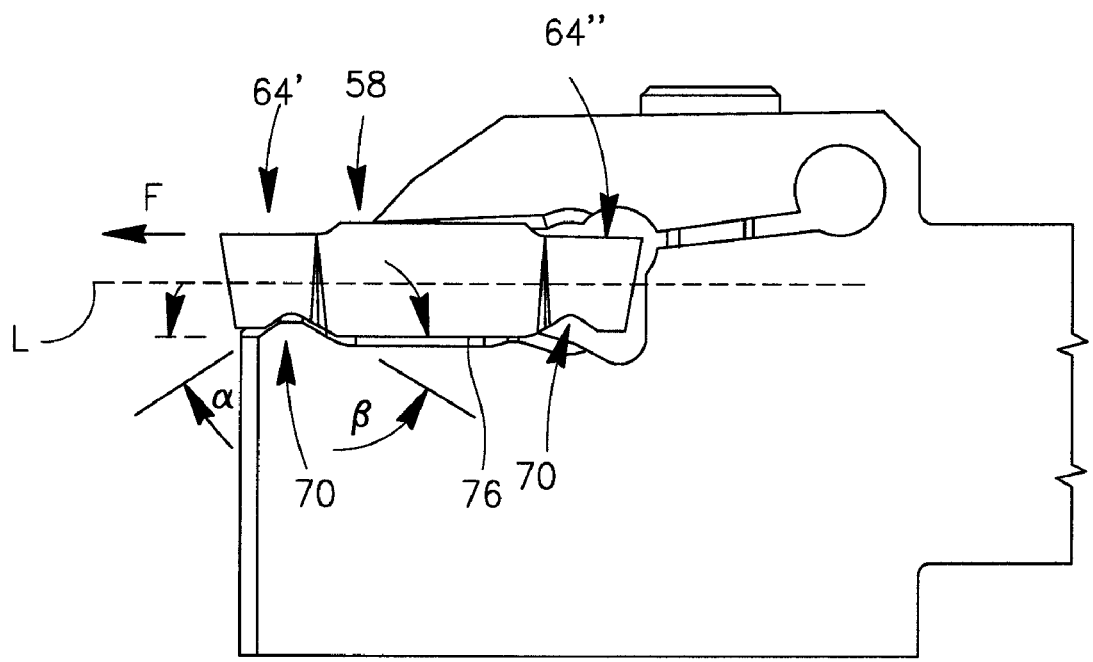
FIG. 7 is a side view of a cutting tool according to embodiments of the present invention.
Figure 8:
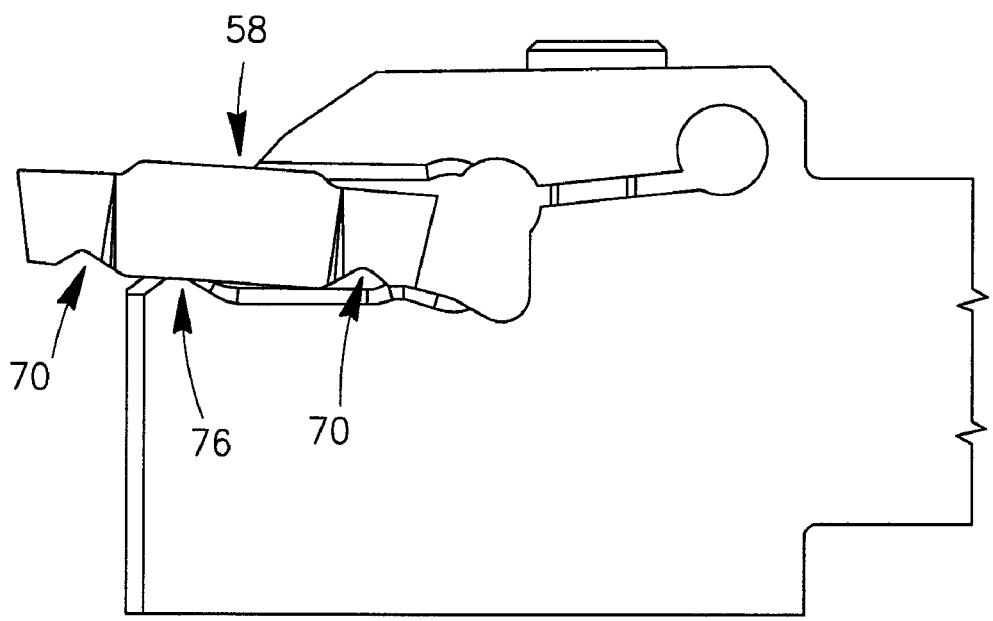
FIG. 8 is a side view of a cutting tool according to embodiments of the present invention with a cutting insert partially inserted into the insert pocket.

The surface of each recess 70 may be divided into several surface sections. In accordance with some embodiments, each recess 70 may have two front recess sections 74 which are inclined to each other and which are each inclined at the first angle α to a lower edge 76 of the shaft portion 66 of the cutting insert 14 and two back recess sections 78 which are inclined to each other and which are each inclined at the second angle β to the lower edge 76. In accordance with some embodiments there may be two lower edges 76 formed along the shaft portion 66 at the intersection of peripheral side surface 62 and the lower insert surface 60. As best seen in FIG. 7, in a side view of the cutting insert 14 the insert recesses 70 extend above the lower edge 76 of the shaft portion 66 in the direction of the upper insert surface 58.

In accordance with some embodiments, each recess 70 may further be provided with two intermediate recess sections 80. One intermediate recess section 80 being located between, and spacing apart, each pair of front and back recess sections 74, 78 of a given recess 70. The two front recess sections 74 may be separated by a mid front recess section 74'. The two back recess sections 78 may be separated by a mid back recess section 78' and the two intermediate recess sections 80 may be separated by a mid intermediate recess section 80'. The two front recess sections 74 may lie on a common surface forming a front recess abutment surface 74". The two back recess sections 78 may lie on a common surface forming a back recess abutment surface 78". The front recess abutment surface 74" and the back recess abutment surface 78" may thus be separated in the longitudinal direction by the intermediate recess sections 80, which generally do not serve as abutment surfaces when the cutting insert 14 is seated in the insert pocket 16.

Located between the cutting portions 64 of the cutting insert 14 in the upper insert surface 58 extending along the shaft portion 66 is an upper abutment surface 82 in the form of a longitudinal groove. In some embodiments, the upper abutment surface 82 may have a concave shape in a cross-section taken in a plane perpendicular to the longitudinal direction of the cutting insert 14. In some embodiments, the concave shape may be a concave V-shape. The upper abutment surface 82 has a complementary shape to the shape of the upper jaw lower surface 36.

Figure 5:
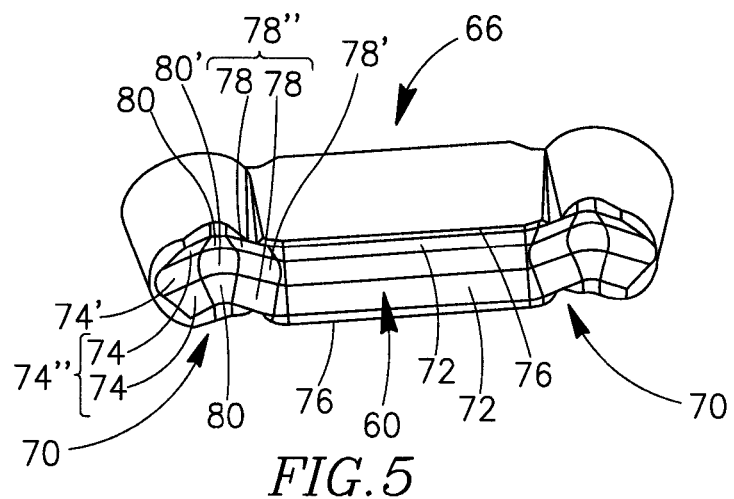
FIG. 5 is a bottom perspective view of a cutting insert according to embodiments of the present invention.
Figure 6:
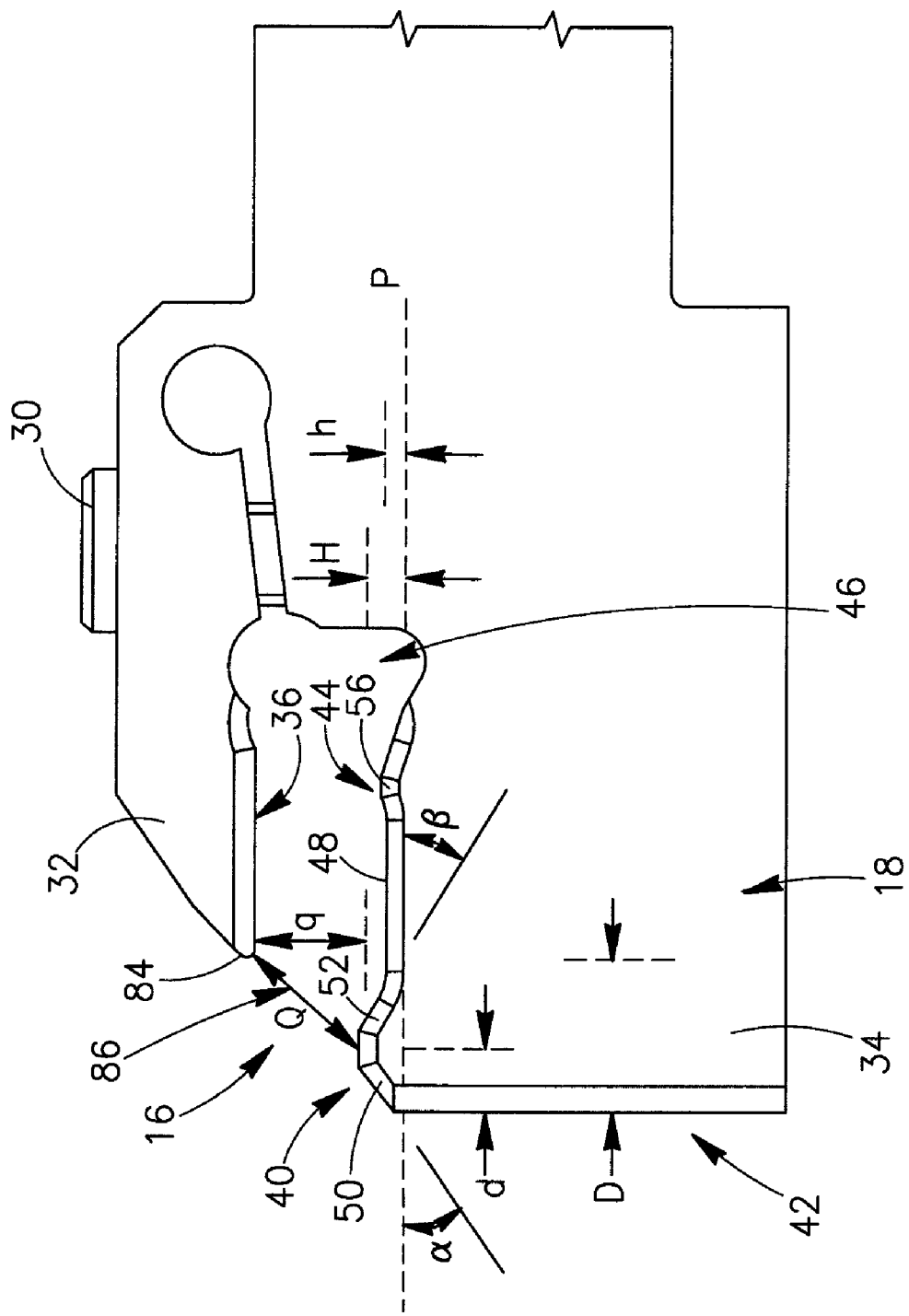
FIG. 6 is a side view of an insert holder according to embodiments of the present invention.

As can be seen in FIG. 6, in accordance with some embodiments, the upper jaw 32 has a free end 84 located longitudinally further from front end 42 of the insert retaining portion 18 than the forward projection 40. In other words, the free end 84 of the upper jaw 32 is located longitudinally rearward of the forward projection 40. In FIG. 5 the free end 84 of the upper jaw 32 is shown to be located a first longitudinal distance D from the front end 42, whereas the forward projection 40 is shown to be located a second longitudinal distance d from the front end 42 (measured from a midpoint of the forward projection 40), where the first longitudinal distance D is greater than the second longitudinal distance d.

Figure 4:
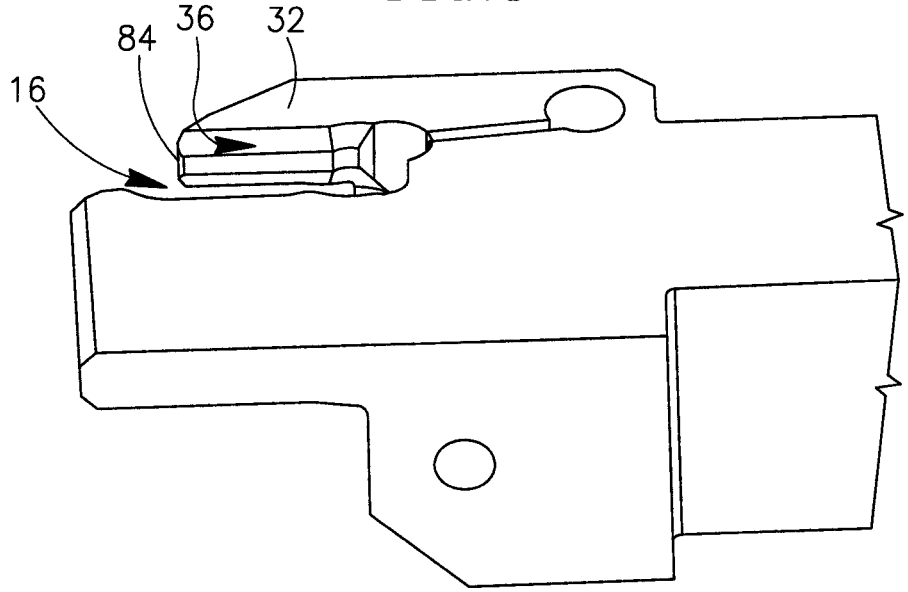
FIG. 4 is a bottom perspective view of an insert holder according to embodiments of the present invention.

In order to insert the cutting insert 14 into the insert pocket 16, the upper and lower jaws 32, 34 have to be forced apart sufficiently to enable the insertion of the non-operative cutting portion 64" of the cutting insert 14 into the insert pocket 16. In a side view of the insert holder, the insert pocket 16 has an entrance aperture 86 having a linear entrance dimension Q. The fact that the free end 84 of the upper jaw 32 is located longitudinally rearward of the forward projection 40 increases the linear entrance dimension from q (the vertical height between the free end 84 of the upper jaw 32 and the uppermost portion of the forward projection 40 in a side view of the insert holder, which would have defined the linear entrance dimension if the free end 84 was directly above the uppermost portion of the forward projection 40) to the value Q. The increase in size in the entrance aperture 86 means that the upper and lower jaws 32, 34 have to be forced apart by a lesser amount in comparison to the situation in which the linear entrance dimension of the entrance aperture 86 is not increased. This also makes it easier to insert the cutting insert 14 in the insert pocket 16 (FIG. 6). Moreover, as seen in FIGS. 1 and 4, with the free end 84 of the upper jaw 32 located longitudinally rearward of the forward projection 40 the operative cutting portion 64' may be located at the forward end 42 of the insert holder 12, instead of beyond it as in the prior art, without concerns that upper clamping jaw 32 will be damaged by chips removed from a workpiece. Consequently, operative cutting portion 64' is well supported from below.

When the cutting insert 14 is secured in the insert pocket 16 with the clamping screw 30 tightened, at least a forward portion of the upper jaw lower surface 36 abuts the upper abutment surface 82 of the upper insert surface 58, the forward projection 40 of the lower jaw 34 abuts an associated recess 70 in the lower insert surface 60 and the rear projection 44 of the lower clamping jaw 34 abuts the lower abutment surface 72 of the lower insert surface 60. The forward portion of the upper jaw lower surface 36 that abuts the upper abutment surface 82 of the upper insert surface 58 may include the upper jaw lower surface 36 adjacent the free end 84 of the upper jaw 32. Since this region is located longitudinally rearward of the forward projection 40 the clamping force applied by the upper jaw 32 on the cutting insert 14 acts along a line transverse to the longitudinal axis of the insert and passing between the forward and rear projections 40, 44 giving rise a balanced clamping force.

In accordance with some embodiments, there exists a three-point (or, three-region) contact between the lower insert surface 60 and the lower jaw upper surface 38. The forward projection 40 abuts the associated recess 70 with: (i) the forward projection front abutment surface 50" abutting the front recess abutment surface 74"; (ii) the forward projection back abutment surface 52" abutting the back recess abutment surface 78" and (iii) the rear projection abutment surface 56" of the rear projection 44 of the lower clamping jaw 34 abutting the lower abutment surface 72 of the lower insert surface 60.

However, generally speaking, the forward projection intermediate sections 54 of the lower jaw upper surface 38 do not abut the intermediate recess sections 80 of the insert 14. Additionally, none of the mid forward projection front section 50', the mid forward projection back section 52' or the mid rear projection section 56' of the lower jaw upper surface 38 abuts an opposing surface of the insert 14.

The balanced clamping force, together with the three-point contact and the condition that the first angle α is greater than the second angle β has been found to give rise to very stable clamping and retainment of the cutting insert 14.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool having a feed direction (F) and comprising an insert holder and a cutting insert releasably retained in an insert pocket formed between an upper jaw and a lower jaw of the insert holder, the insert pocket having a longitudinal axis defining a forward to rear direction;
   the upper jaw comprising an upper jaw lower surface;
   the lower jaw comprising:
     a lower jaw upper face facing the upper jaw lower surface;
       a forward projection adjacent a forward end of the insert holder, the forward projection having a forward projection front abutment surface inclined at a first angle (α) to the feed direction (F) and a forward projection back abutment surface inclined at a second angle (β) to the feed direction (F), the upper jaw having a free end located longitudinally rearward of the forward projection;
     a rear projection separated from the forward projection by a lower jaw indentation and having a rear projection abutment surface;
   the cutting insert comprising:
     an upper insert surface, a lower insert surface and a peripheral side surface extending therebetween;
     at least one cutting portion adjacent a longitudinally extending shaft portion;
     a recess in the lower insert surface adjacent to and extending into the at least one cutting portion, the recess having a front recess abutment surface inclined at the first angle (α) to a lower edge of the shaft portion and a back recess abutment surface inclined at the second angle (β) to the lower edge of the shaft portion, wherein the first angle (α) is greater than the second angle (β);
     a lower abutment surface in the form of a longitudinal groove in the lower insert surface extending along the shaft portion; and
     an upper abutment surface in the form of a longitudinal groove in the upper insert surface extending along the shaft portion;
   wherein:
     at least a forward portion of the upper jaw lower surface abuts the upper abutment surface of the upper insert surface;
     the forward projection front abutment surface abuts the front recess abutment surface;
     the forward projection back abutment surface abuts the back recess abutment surface; and
     the rear projection abutment surface abuts the lower abutment surface.

2. The cutting tool according to claim 1, wherein the first angle (α) in the range 25° to 50° and the second angle (β) in the range 20° to 45° along with the condition that the first angle (α) is greater than the second angle (β).

3. The cutting tool according to claim 1, wherein the forward projection front abutment surface comprises two forward projection front sections that are inclined to each other, the forward projection back abutment surface comprises two forward projection back sections that are inclined to each other, and the rear projection abutment surface comprises two rear projection sections which are inclined to each other.

4. The cutting tool according to claim 1, wherein:
   the forward projection further has at least one forward projection intermediate section spacing apart the forward projection front abutment surface and the forward projection back abutment surface; and
   the recess has at least one intermediate recess section spacing apart the front recess abutment surface and the back recess abutment surface; and
   the at least one forward projection intermediate section does not abut the at least one intermediate recess section.

5. The cutting tool according to claim 4, wherein:
   the forward projection front abutment surface comprises a pair of forward projection front sections separated by a mid forward projection front section;
   the forward projection back abutment surface comprises a pair of forward projection back sections separated by a mid forward projection back section;
   the rear projection abutment surface comprises a pair of rear projection sections separated by a mid rear projection section; and
   none of the mid forward projection front section, the mid forward projection back section or the mid rear projection section abuts an opposing surface of the cutting insert.

6. The cutting tool according to claim 1, wherein:
   the forward projection front abutment surface comprises a pair of forward projection front sections separated by a mid forward projection front section;
   the forward projection back abutment surface comprises a pair of forward projection back sections separated by a mid forward projection back section;
   the rear projection abutment surface comprises a pair of rear projection sections separated by a mid rear projection section; and
   none of the mid forward projection front section, the mid forward projection back section or the mid rear projection section abuts an opposing surface of the cutting insert.

7. A cutting insert comprising:
   an upper insert surface, a lower insert surface and a peripheral side surface extending therebetween;
   at least one cutting portion adjacent a longitudinally extending shaft portion;

a recess in the lower insert surface adjacent to and extending into the at least one cutting portion, the recess having a front recess abutment surface inclined at a first angle ($\alpha$) to a lower edge of the shaft portion and a back recess abutment surface inclined at a second angle ($\beta$) to the lower edge of the shaft portion;

a lower abutment surface in the form of a longitudinal groove in the lower insert surface extending along the shaft portion;

an upper abutment surface in the form of a longitudinal groove in the upper insert surface extending along the shaft portion;

wherein the first angle ($\alpha$) is greater than the second angle ($\beta$).

8. The cutting insert according to claim 7, wherein the first angle ($\alpha$) in the range 25° to 50° and the second angle ($\beta$) in the range 20° to 45° along with the condition that the first angle ($\alpha$) is greater than the second angle ($\beta$).

9. The cutting insert according to claim 7, wherein the front recess abutment surface comprises two front recess sections that are inclined to each other, and the back recess abutment surface comprises two back recess sections that are inclined to each other.

10. The cutting insert according to claim 7, wherein:

the cutting insert is double-ended with a cutting portion adjacent each end of the shaft portion; and each cutting portion has an associated recess in the lower surface.

11. The cutting insert according to claim 10, wherein:

each recess extends above the lower edge in a direction of the upper insert surface.

12. The cutting insert according to claim 7, further comprising:

at least one intermediate recess section spacing apart the front recess abutment surface and the back recess abutment surface.

13. The cutting insert according to claim 12, comprising:

two intermediate recess sections located between the front recess abutment surface and the back recess abutment surface; and a mid intermediate recess section separating the two intermediate recess sections.

14. The cutting insert according to claim 13, wherein:

the cutting insert is double-ended with a cutting portion adjacent each end of the shaft portion; and each cutting portion has an associated recess in the lower surface.

15. The cutting insert according to claim 14, wherein:

each recess extends above the lower edge in a direction of the upper insert surface.

* * * * *